United States Patent [19]

Grenier

[11] Patent Number: 4,605,043
[45] Date of Patent: Aug. 12, 1986

[54] SNAP-ON HEAT INSULATING JACKET AND METHOD FOR ENCLOSING DUCTING

[75] Inventor: Claude A. Grenier, Mesa, Ariz.

[73] Assignee: Walter Allen Plummer, Sherman Oaks, Calif.

[21] Appl. No.: 638,852

[22] Filed: Aug. 8, 1984

[51] Int. Cl.[4] .......................... F16L 58/00; B32B 1/08
[52] U.S. Cl. .................................... 138/149; 138/151; 138/168; 156/247; 156/308.4; 428/36; 428/40; 428/192; 428/194; 428/920
[58] Field of Search ................... 428/192, 194, 36, 40, 428/920; 138/149, 151, 156, 168, 170, 171; 156/247, 308.4

[56] References Cited

U.S. PATENT DOCUMENTS

| | | | |
|---|---|---|---|
| 3,092,530 | 6/1963 | Plummer | 428/192 |
| 3,682,163 | 8/1972 | Plummer | 138/168 |
| 3,858,282 | 1/1975 | Plummer | 138/168 |
| 3,925,856 | 12/1975 | Plummer | 138/168 |
| 4,022,248 | 5/1977 | Hepner et al. | 138/149 |
| 4,033,474 | 7/1977 | Rentmeester | 138/156 |
| 4,243,453 | 1/1981 | McLintock | 138/149 |

Primary Examiner—Paul J. Thibodeau
Attorney, Agent, or Firm—Sellers and Brace

[57] ABSTRACT

Enclosed is an improved snap-on heat insulating jacket for ducting and method uniquely designed for simplicity and ease of assembly. Resilient heat insulating material is laminated to a flexible sheet plastic main body provided with interlocking snap-on seam members positioned, when closed, for concealment by an external guard flap coated on its inwardly facing surface with pressure sensitive adhesive thereby to embrace the ducting with a cover having a substantially continuous smooth outer surface free of foreign matter collecting crevices and the like.

2 Claims, 4 Drawing Figures

SNAP-ON HEAT INSULATING JACKET AND METHOD FOR ENCLOSING DUCTING

This invention relates to a snap-on heat insulating jacket for ducting and to a method of preparing and installing the same featuring an external guard flap bridging and concealing the seam and coated on its inwardly facing surface with pressure sensitive adhesive.

BACKGROUND OF THE INVENTION

There are innumerable environments having need for covering both hot and cold ducts with heat insulating material in a low cost expeditious manner and the exterior of which is free of depressions, crevices and the like in which foreign matter can collect and present difficult removal problems. Examples include food and drug processing establishments, hospitals, clean rooms for the manufacture of high precision products, etc.

Many proposals to meet these needs embody laminated heat insulating jackets provided with separable interlockable seams. Illustrative United States patents disclosing such jackets include Plummer No. 3,092,530; Eichberg No. 3,638,286; Plummer No. 3,682,163; Plummer No. 3,858,282 and Plummer No. 3,925,856. In all except the first mentioned one of these patents the interlocking seam members exhibit outwardly exposed crevices, pockets and the like extending lengthwise of the seam in which food stuff and foreign matter generally can become deposited, rendering the jacket unsanitary and difficult if not impossible to cleanse. It has been common practice particularly in jackets made to embrace conductors and cabling to provide a seamed jacket with a guard flap bridging the interior side of the seam members and effective to provide an electrical shielding layer embracing the cabling as well as a guard preventing the jacket contents to interfere with closure of the seam. The first mentioned one of the Plummer patents also shows a jacket with a guard flap bridging the exterior of the plastic seam members and coated with heat reflecting material to protect the plastic seam from momentary high temperatures occasioned by the launching of rockets and the like. The objective served is the prevention of damage to the plastic seam by the temporary high temperatures.

Prior to this invention applicant's assignee and his competitors have been utilizing heat insulating jackets having an external guard flap bridging the seam members but each of these involves laborious and time consuming operations to hold the guard flap pressed against the exterior of the jacket body. For example, prior to this invention, my assignee relied upon elongated rigid members held pressed against the flap by a multiplicity of temporary tie bands. While the guard flap is so held caulking compound was applied along the edge of the guard flap and allowed to take a set before removing the restraining bands and the rigid members. This technique requiring the joint efforts of two or more workmen requires an excessive amount of assembly and disassembly time by costly labor as well as a waiting period for the caulking to take a set with the possibility that portions will exhibit an unsealed gap and recesses for the collection of foreign material. Longitudinally slit heat insulating jackets have also been proposed which rely upon pressure sensitive adhesive applied to the lateral extension of one edge of the outer jacket layer to hold the jacket assembled about tubing. Such jackets present assembly problems owing to the skill required in holding the adhesive free of contact with the jacket while at the same time holding the jacket as a whole snugly contracted and closed about the tubing. Furthermore, upon release of the contracting forces, the adhesive is placed under shear stresses and may fail prematurely thereby allowing partial if not complete disassembly of the jacket.

SUMMARY OF THE INVENTION

The present invention greatly simplifies the assembly of the improved jacketing readily performed by a single workman as an incident to the closure of the jacket seam. This is achieved by providing the flexible outer layer of the jacket with a wide guard flap coated on its inwardly facing surface with temporarily masked pressure sensitive adhesive. The mask is peeled away following snap closure of the seam, whereupon the guard flap is pressed firmly and immovably against the exterior of the jacket without need for the application of either rigid strips or tie members of any kind. While the guard flap is held firmly sealed by the adhesive additional protection against loosening of the guard flap by applying a quickly setting sealing compound between the lateral edge of the guard flap and the contiguous outer surface of the jacket is applied. In this manner a substantially superior assembly is achieved in a fraction of the time and far more economically than heretofore. The completed assembly presents a continuous smooth outer surface devoid of crevices or depressions in which germs and foreign matter can become lodged.

Accordingly it is a primary object of this invention to provide a laminated heat insulating jacket for ducting having an outer main body of high impact strength flexible plastic provided with a snap lock seam and an external guard flap concealing the seam and held closed against the jacket body by a coating of pressure sensitive adhesive on its inner surface.

Another object of the invention is the provision of a seam-equipped laminated heat insulating jacket for ducting having an external guard flap integral with the flexible high strength main body of the jacket and positioned to bridge and conceal the seam when closed and provided on its inwardly facing surface with pressure sensitive adhesive for bonding it flush against the main body to provide a smooth crevice-free exterior surface.

These and other more specific objects will appear upon reading the following specification and claims and upon considering in connection therewith the attached drawing to which they relate.

Referring now to the drawing in which a preferred embodiment of the invention is illustrated:

Figure 4:
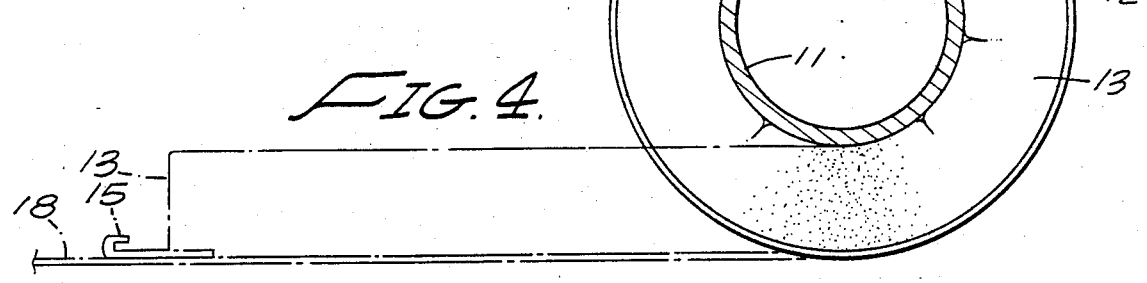
FIG. 4 is an end view on a slightly enlarged scale showing the invention jacketing fully assembled in full line and in the process of being assembled by dot and dash lines.

As is best shown in FIG. 4, jacket 10 comprises a one piece laminated assembly having an exterior outer wall of impervious sheet plastic bonded to an inner lining of heat insulating material of any suitable flexible character, such as a blanket of fiber glass, flexible polyeurethane foam or the like. Suitable main body material includes high impact glossy PVC and other flexible sheet plastics. Prior to the lamination of the main body 12 to the insulating material 13 a pair of hook shaped interlocking seam members 15 and 16 are secured to the inner or liner surface of the main body, seam member 15 being secured spaced well inwardly from one lateral edge of the main body to provide a wide external guard flap 18. The other seam member 16 is secured to the inner or liner side of the other lateral edge of the main body. Seam members 15 and 16 preferably have a snap-on cross sectional shape such as that shown and are formed by extrusion from suitable flexible plastic. The J-shaped hooks at their free lateral edges interfit with a snap lock and are held closed by the radial and circumferential pressure exerted by the resilient heat insulating material 13.

The inwardly facing surface of guard flap 18 is provided with a strip of pressure sensitive adhesive covered until ready for use by a masking strip 21. The adhesive strip 20 comprises a tape coated on both sides with adhesive, the two layers being selected for their abilities to form a strong and long lasting bond with the guard flap and with the main body 12.

The invention jacket is formed in long strips for storage in flat condition until applied to ducting 11. Application of the jacketing to ducting is accomplished by wrapping it about the duct as indicated in FIG. 4 and contracting it snugly thereabout until the two overlapped seam members 15 and 16 snap together. The jacket then grips the duct firmly with guard flap 18 extending generally tangentially from the interlocked seam. A protective masking strip 21 is then peeled from adhesive 20 and the guard flap is pressed against the underlying portion of the main body thereby completely covering and bridging the seam and the crevices associated therewith.

Figure 1:
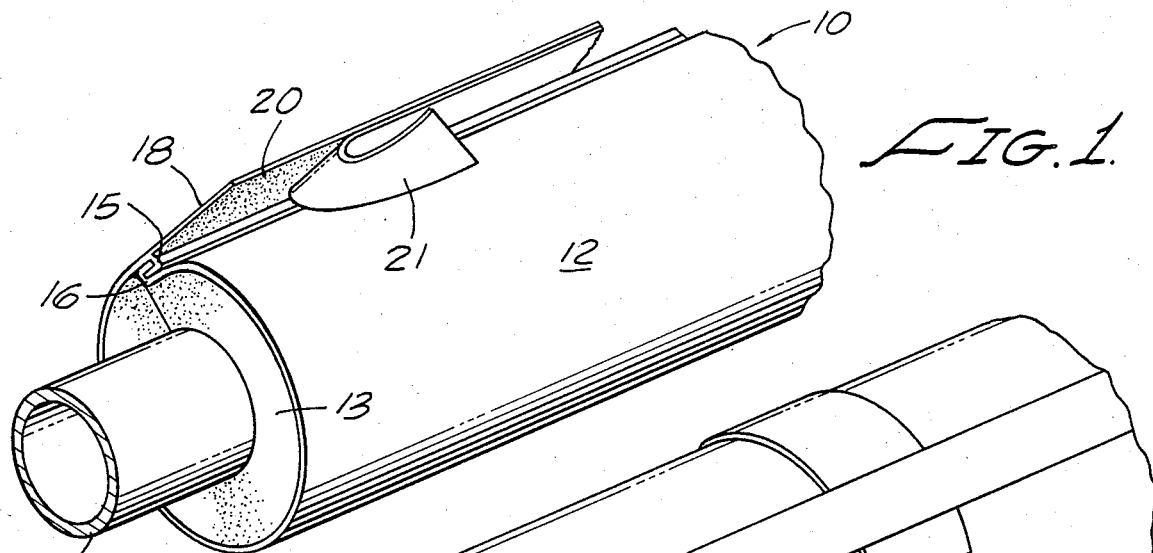
FIG. 1 is a fragmentary perspective view of the invention jacketing partially assembled to a duct with the mask for the adhesive coating on the guard flap partially peeled away.
Figure 2:
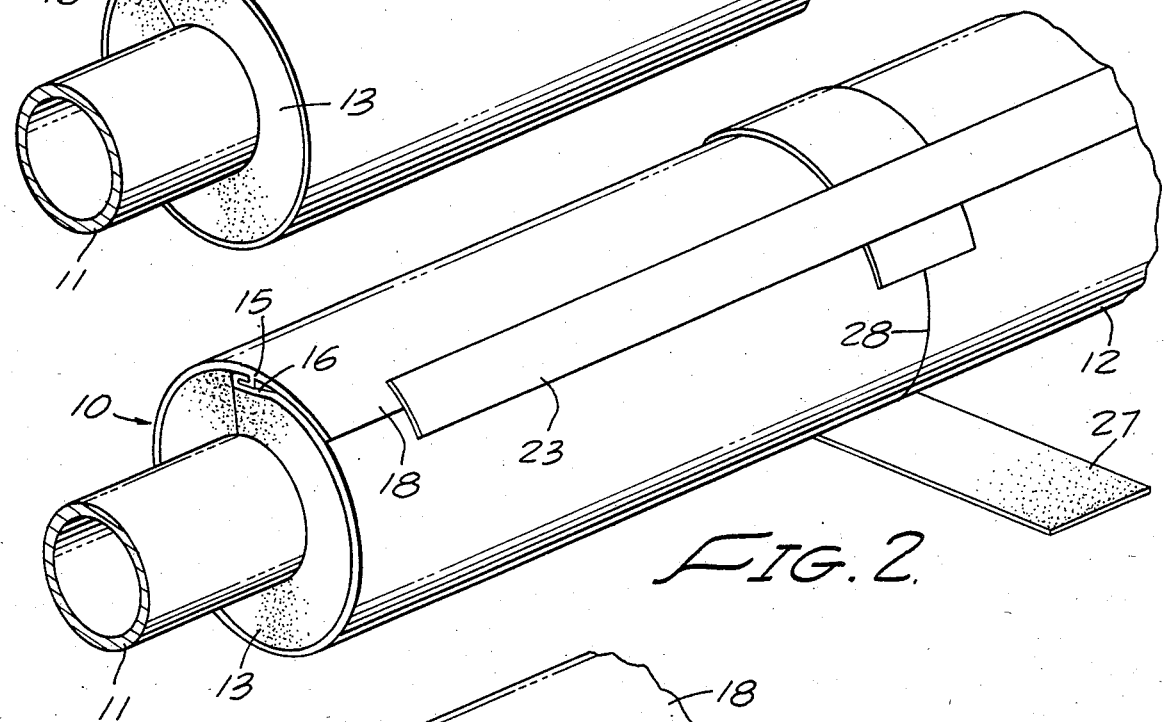
FIG. 2 is a view generally similar to FIG. 1 but showing a temporary strip of adhesive tape applied over the free edge of the guard flap and also showing a ringlet of pressure sensitive tape covering the butt joint between two adjacent sections of jacketing.

Additional lengths of jacketing 12 are then applied to the duct in the same manner, care being exercised to have the ends of adjacent sections in snug abutment with one another as indicated in FIG. 2. If the user anticipates a need for opening the jacket for any purpose, he may apply a strip of pressure sensitive tape 23 to cover the free lateral edge of the guard flap thereby avoiding the risk of it being accidentally lifted away from the main body. Usually a permanent installation is desired in which event the operator proceeds to permanently bond the edge of the guard flap to the main body with a smooth application of a suitable fluent bonding or welding agent 25 applied from the dispensing spout 26 of a container 27. Any excess bonding agent is removed by finger pressure or a suitable levelling tool so that the finished assembly presents a smooth surface free of interruptions or defiles in which foreign matter can collect. The resulting assembly presents a continuous smooth outer surface wherein the interlocked assembly seam is fully concealed.

Figure 3:
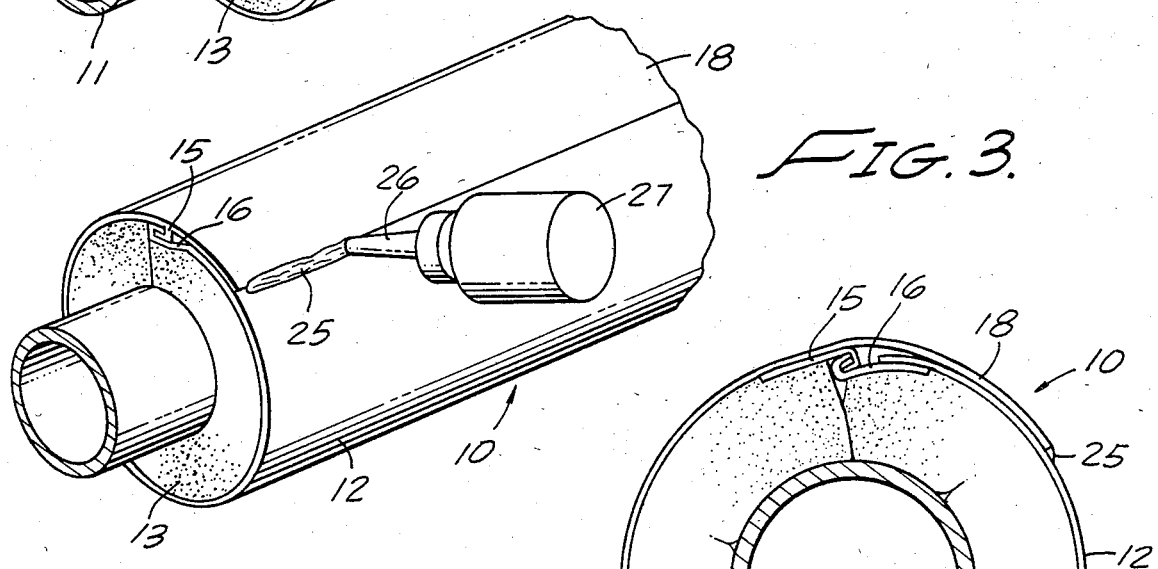
FIG. 3 is a fragmentary perspective view of the jacketing with the guard flap sealed closed and in the process of having its lateral edge welded to the adjacent portion of the jacket body.

Following application of the bonding agent 25 to the guard flap the user applies a wide strip of pressure sensitive adhesive tape 27 of the same material as the main body of the jacket bridging and concealing the butt joint 28 between the ends of adjacent sections of the jacketing. The opposite lateral edges of tape 27 are then bonded to the jacketing sections. A bonding agent is not shown applied to the lateral edges of tape 27 in FIG. 2, because this step is not performed until the tape has been fully wrapped about the butt joint but it will be understood that it is applied in the same manner as described for weld 25 in FIG. 3. The completed assembly is vapor tight and smooth surfaced from end to end thereof.

While the particular improved snap-on heat insulating jacket and method for enclosing ducting herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An improved method of providing installed ducting with a heat insulating jacket of the type having an impervious flexible main body of high impact strength plastic laminated to resilient heat insulation between a pair of interlockable seam members so positioned relative to the opposite edge portions of main body as to provide the same with an external guard flap sufficiently wide to bridge and extend very substantially beyond the exterior of said seam members when closed, said improved method comprising:

providing the inwardly facing side of said external guard flap with a layer of pressure sensitive adhesive covered prior to use with a readily separable protective mask strip;

assembling said jacket about ducting and interlocking said seam members beneath said guard flap; removing said protective mask strip from said adhesive;

pressing said guard flap and said adhesive layer against the underlying surface of said main body thereby to conceal said seam members and provide the same with a vapor-tight sealed cover and applying a bevelled layer of a permanently settable bonding agent between the free lateral edge of said guard flap and the contiguous surface of said main body lying outwardly of said free lateral edge thereby to augment the sealing of said guard flap to said main body and cooperating therewith to provide an assembled jacket with a continuous smooth outer surface free of foreign matter collecting crevices.

2. In a heat insulated seamed jacket assembly for enclosing installed ducting with a sanp-on enclosure of the type having a main outer body formed of high impact strength flexible impervious sheet plastic laminated to a resilient layer of heat insulating material affixed to the inwardly facing side thereof and provided with a pair of interlocking seam members secured to the opposite lateral portions of said main body so as to provide an external guard flap sufficiently wide to bridge and extend very substantially beyond the exterior of said seam members when snapped closed, that improvement comprising:

a layer of non-permanently masked pressure sensitive adhesive adherent to the inwardly facing surface of said external guard flap adapted, upon removal of said mask after assembly of said jacket to ducting, to hold said guard flap pressed across the exterior of said closed seam members and firmly sealed against the underlying juxtaposed exterior surface of said main body thereby to conceal said seam members; and a permanently settable initially fluent bonding agent distributed in a bevelled layer along the free lateral edge of said guard flap and the adjacent outer surface of said main body permanently bonding said guard flap to said main body and providing said installed jacket assembly with a continuous outer surface free of foreign matter collecting crevices.

* * * * *